United States Patent Office 3,431,186
Patented Mar. 4, 1969

3,431,186
ELECTROLYTIC PROCESS FOR THE CLEAVAGE OF THIOL ESTERS OF AROMATIC CARBOXYLIC ACIDS
Leopold Horner, Mainz-Bretzenheim, and Heinz Neumann and Rolf Geiger, Frankfurt am Main, Germany, assignors to Farbwerke Hoechst Aktiengesellschaft vormals Meister Lucius & Bruning, Frankfurt am Main, Germany, a corporation of Germany
No Drawing. Filed Feb. 17, 1966, Ser. No. 528,063
Claims priority, application Germany, Feb. 25, 1965, F 45,353
U.S. Cl. 204—73
Int. Cl. C07b 7/00; B01k 1/00
1 Claim The present invention relates to a process for the cleavage of thiol esters of aromatic carboxylic acids, which comprises, in the presence of tetraalkyl ammonium salts, electrolytical reduction of compounds of the general Formula I $$R\text{---}CO\text{---}S\text{---}R' \qquad (I)$$

wherein R represents a phenyl radical which may be substituted by a low molecular alkyl, alkoxy or halogen, R' represents a low molecular alkyl, cycloalkyl having 5–8 carbon atoms, a phenyl or phenalkyl which may be substituted by a low molecular alkyl, and the radical of an amino acid or of a peptide.

It is already known to cleave thiol esters of carboxylic acids by way of alkaline hydrolysis, alkoholysis and particularly by aminolysis. Of particular interest are the thiol esters of amino acids and of peptides, because they are converted into acid amides or peptides by aminolysis and can thus be used in the peptide chemistry as "active esters." The acylation, for instance, in particular the benzoylation of amino acids containing thiol groups, for the protection of these groups is recommended in the Journal of the American Chemical Society 85, 1337 (1963).

The applicability of this method, however, is limited, because in the course of peptide synthesis the benzoyl radical may be transferred to the amine component by transacylation, and the peptides may, under the conditions of the alkaline cleavage of the S-benzoyl protection group, cause numerous side-reactions, which can be controlled only with difficulty. The benzoyl radical, therefore, has been used as S-protective group only on a small scale in peptide chemistry.

The process of the present invention removes these disadvantages and presents a safe way of cleaving thiol esters of aromatic carboxylic acids. As aromatic carboxylic acid, benzoic acid is preferred, which may be substituted, if desired, by low molecular alkyl, alkoxy and halogen. Halogen, if present, may be replaced by hydrogen under the reaction conditions, but this is of no importance in the present invention.

The tetraalkyl ammonium salts used are derived from inorganic acids such as hydrohalic acid, particularly hydrochloric and hydrobromic acid, sulfuric acid, phosphoric acid or perchloric acid. As salt-forming substances also inorganic acids such as formic acid, acetic acid, propionic acid and higher molecular fatty acids as well as aromatic carboxylic acids such as benzoic acid enter into consideration. The tetraalkyl ammonium group contains up to 4 carbon atoms per alkyl radical; tetramethyl ammonium salts are preferably used.

The reaction is carried out in an electrolysation vessel whose anode and cathode regions are separated by a diaphragm. Anode material is preferably graphite, but it is also possible to use borocarbide and other carbides. Cathode materials are metals such as mercury, lead, iron and platinum, mercury is preferably used.

Appropriate solvents are low molecular aliphatic alcohols, preferably methanol and mixtures thereof with water, furthermore water or aqueous solutions of appropriate ethers such as dioxane or tetrahydrofurane, N-alkylamides of aliphatic carboxylic acids such as dimethyl formamide, dimethyl acetamide, N-methyl pyrrolidone, if desired with addition of water. To ensure a fast and quantitative reaction it is advisable to add an excess of tetraalkyl ammonium salt. A quantitative proportion of three parts of ammonium salt per one part of the substrate to be separated has proved to be particularly advantageous, but it is also possible to effect the reaction in a proportion inferior or superior to that indicated above. The reaction temperature ranges from 0 to 20° C., preferably from 5 to 10° C. The reaction ceases with increased hydrogen development. To achieve a reaction as quantitiative as possible, it is advisable to extend the period of time theoretically required for the reduction by about 200 to 400 percent.

Several processes are known for the isolation of thiol esters which are applied in correspondence with the product formed. When using amino acids and peptides it is advisable to take advantage of the sparing solubility of these compounds in appropriate solvents such as methanol or ethanol. The thiol esters can also be isolated with the aid of appropriate, sparingly soluble salts of heavy metals, for example mercury or copper salts and by way of a subsequent splitting with hydrogen sulfide. If the thiol compounds are derivatives of amino acids such as cystein, or peptides containing one or several free amino groups, in many cases sparingly soluble salts are obtained with aromatic sulfonic acids such as toluene sulfonic acid, β-naphthalene sulfonic acid, or with more complicated sulfonic acids which are described, for example, in J. Biol. Chem. 143, 121 (1942). If one or several carboxyl groups of such peptides are present in their free forms, the isolation is effected with the aid of salts with appropriate bases such as dicyclohexyl amine, for instance.

The separation from tetraalkyl ammonium salt is also made possible with appropriate ion exchangers, It is possible to adsorb the amino acid or, if free amino groups are present, the peptide, together with tetraalkyl ammonium salt, on a strongly acid ion exchanger. In most cases the selective elution is brought about with the aid of ammonia or ammonium acetate buffer. If free carboxyl groups are present, it is also possible to use basic exchangers, the elution then being carried out preferably with acetic acid. A number of basic peptides are adsorbed on the weakly acid ion exchanger Amberlite IRC–50, whereas tetraalkyl ammonium salts of strong acids are not adsorbed. In this case the elution is brought about easily with pyridine-containing buffer mixtures.

If the thiol compounds are not amino acids or peptides, the isolation is carried out by extraction from an aqueous solution, distillation and crystallisation, or by an appropriate combination of these methods.

The process of the present invention produces thiol and alcohols in excellent yields. During the reduction, no by-products are formed.

General working instructions

For the electrolysis 10 mols of the substrate to be separated are used respectively together with 30 mmols of tetramethyl ammonium chloride in 35 ccm. of methanol. After cooling the reaction mixture to +5°, the clay shell is inserted with graphite anode and cooling finger into the electrolysation vessel. The distance between mercury surface and bottom of the shell is 0.5 to 1 cm. The space around the anode is filled with water. After closing the circuit, the current strength increases rapidly. It is maintained at 1 ampere by means of a resistance. If 2 electrolysation vessels are connected in series, approximately 40 volts are made up. It is of advantage to stir during the reaction. 10 minutes after hydrogen developed sets in, the electrolysis is stopped and the reaction product is worked up. In general the reaction is carried out at temperatures ranging from 5° to 10° C.

The following example serves to illustrate the invention but is not intended to limit it thereto.

Cleavage of S-benzoyl-L-cystein 2.25 g. (10 mmols) of S-benzoyl-L-cystein, prepared in accordance with J. Amer. Chem. Soc. 85, 1337 (1963), and 3.3 g. of tetramethyl ammonium chloride are suspended in a mixture of 50 ccm. of dimethyl acetamide and 25 ccm. of water. The electrolysis is carried out at +5 to +10° at 1 ampere and 20 volts. As occassional addition of binormal hydrochloric acid prevents the pH value of the cathode space from becoming alkaline. 15 minutes after setting in of the hydrogen development, the electrolysis is stopped. The solution is filtered and evaporated to dryness in vacuo. The residue is treated with absolute ethanol whereupon 1.01 g. (83% of the theory) of chromatographically pure L-cystein are formed.

In an analogous manner the following compounds were subjected to cleavage and the following yields of thiol were obtained:

| S-acyl group | Thiol | Yield in percent |
|---|---|---|
| Benzoyl | Thiophenol | 91 |
| Do | Benzyl mercaptane | 85 |
| Do | Z-Cys-OH[1] | 87 |
| Do | H-Cys-OH | 83 |
| Do | Z-Cys-Gly-OCH$_3$ | 79 |
| Do | Z-Leu-Cys-Gly-OH | 81 |
| Do | BOC-His-Leu-Cys-Gly-OH[1] | 80 |
| 2-methylbenzoyl | H-Cys-OH | 81 |
| 2-methoxybenzoyl | H-Cys-OH | 78 |
| 4-methylbenzoyl | H-Cys-OH | 80 |
| 4-methoxybenzoyl | H-Cys-OH | 75 |
| 2,6-dichlorobenzoyl | H-Cys-OH | 73 |

[1] Amino acid symbols are used according to E. Brand and J. T. Edsall, Annu. Rev. Biochem. 16, 223 (1947) anf 5th European Peptide Symposium, Oxford 1962, Pergamon Press.
Z = carbobenzoxy-.
BOC = tertiary butyloxycarbonyl-.

We claim:
1. A process for the cleavage of thiol esters of aromatic carboxylic acids, which comprises, passing a unidirectional current through an aqueous acidic mixture of a thiol ester and a tetraalkyl ammonium salt in contact with a cathode at a potential sufficient to electrolytically reduce compounds of the general formula

$$R-CO-S-R'$$

in which R represents a phenyl radical which may be substituted by a low molecular alkyl, alkoxy or halogen, R' represents a low molecular alkyl, cycloalkyl having 5–8 carbon atoms, a phenyl or phenylalkyl which may be substituted by a low molecular alkyl, and the radical of an amino acid or of a peptide.

References Cited

Allen, M. J.: Organic Electrode Processes, Chapman & Hall Ltd., London, 1958, pp. 72–73.

JOHN H. MACK, *Primary Examiner.*

H. M. FLOURNOY, *Assistant Examiner.*